Aug. 16, 1960 G. WHITE 2,948,990
TEMPERING OF SHEET MATERIAL
Filed June 14, 1955
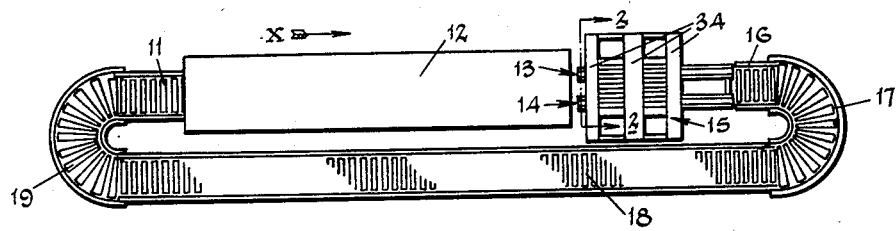
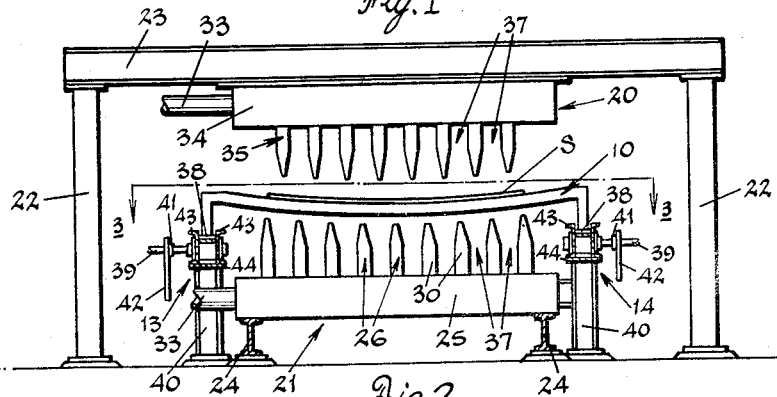
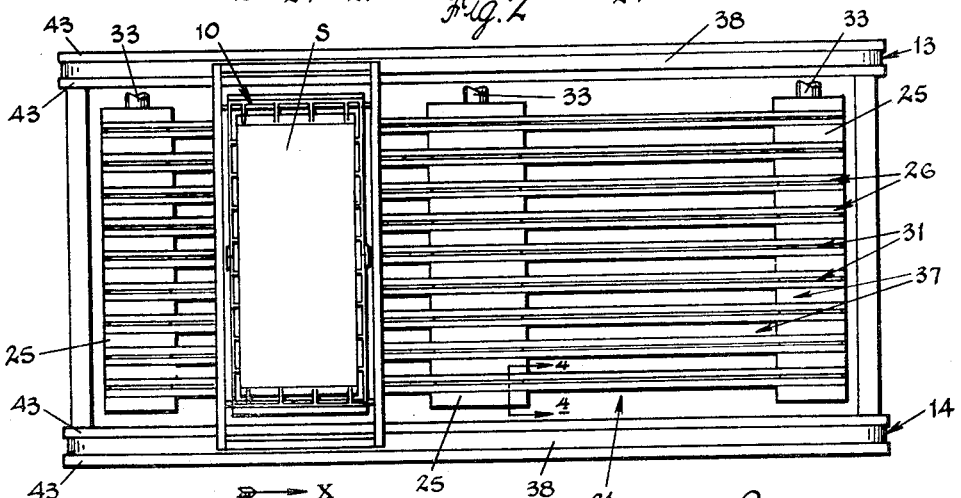
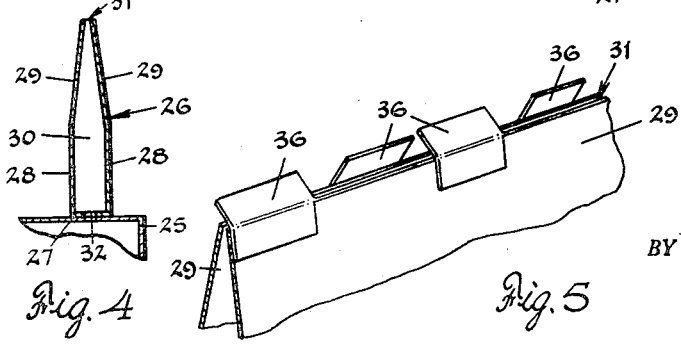
INVENTOR.
Gerald White
BY
Nobbe & Swope
ATTORNEYS

United States Patent Office 2,948,990
Patented Aug. 16, 1960

2,948,990

TEMPERING OF SHEET MATERIAL

Gerald White, Rossford, Ohio, assignor to Libbey-Owens-Ford Glass Company, Toledo, Ohio, a corporation of Ohio Filed June 14, 1955, Ser. No. 515,274

4 Claims. (Cl. 49—45)

The present invention relates broadly to the tempering of sheet material and more particularly to an improved apparatus for tempering glass sheets or plates.

It is common practice in the tempering of glass sheets to first heat the sheets to substantially the point of softening of the glass and then to suddenly chill the heated sheets to place the outer surfaces thereof under compression and the interiors thereof under tension. By this means, the mechanical and heat resistance properties of the sheets may be increased.

It is therefore a primary object of this invention to provide a novel apparatus for evenly tempering glass sheets or the like.

Another object of the invention is to provide means of obtaining a more efficient use of the cooling medium so as to impart greater tempered strength to thin glass sheets than has heretofore been possible by previous methods.

A still further object of the invention is to arrange the nozzles through which the cooling fluid is directed toward the glass to conform as nearly as possible to the shape of the bent glass sheet to thereby achieve a more uniform tempering effect.

A still further object of the invention is to provide a novel means of directing the cooling medium or fluid as it emerges from the nozzles.

Other objects and advantages of the invention will become more apparent during the course of the following description when taken in connection with the accompanying drawings.

In the drawings, wherein like numerals are employed to designate like parts throughout the same:

Fig. 1 is a plan view of the equipment for carrying out the invention showing the general arrangement of the various components thereof;

Fig. 2 is a view taken substantially along lines 2—2 of Fig. 1;

Fig. 3 is a plan view of one portion of the tempering apparatus taken substantially along lines 3—3 of Fig. 2;

Fig. 4 is a vertical sectional view of a nozzle taken substantially along lines 4—4 of Fig. 3; and Fig. 5 is a fragmentary perspective view of a nozzle of the invention.

While the present invention is not restricted to the treating of any particular type or shape of sheet material, it is especially well adapted to carry out the difficult job of tempering curved glass sheets of the type used by the automotive and aircraft industries and will be described in that connection here.

With reference now to the drawings and particularly to Figs. 1 and 2, molds of the type indicated generally at 10 in Fig. 2 carrying glass sheets S to be bent and tempered are started along a conveyor 11 which extends through a furnace or heating chamber 12 and carries the molds into the inlet end thereof. At the discharge end of the furnace 12 the molds are carried on narrow chain conveyors 13 and 14 respectively which pass along the sides of a quenching or tempering station 15 and permit the mold to straddle a lower portion of the quenching system as shown in Fig. 2.

From the chain conveyors 13 and 14 the molds are transferred to another conveyor section 16 leading to a semi-circular conveyor section 17 which reverses the direction of travel of the molds and leads them to a return and unloading conveyor 18 extending alongside the heating chamber 12.

The bent glass sheets, which have now cooled to a temperature at which they may be handled, are removed from the molds along the unloading conveyor 18 and the molds are then carried on a semi-circular conveyor 19 to a loading station at the start of the conveyor 11.

Referring now particularly to the quenching system 15, this system includes an upper blast-head 20 and a lower blast-head 21 through which a suitable cooling medium such as air may be directed upon the sheets as they pass thereby. More particularly, the upper blast-head 20 is mounted above the path of the sheets by a frame structure which includes uprights 22 and cross beams 23, while the lower blast-head 21 is mounted on suitable I-beams or supports 24 below the path of the sheets.

Dealing now specifically with the lower blast-head 21, as may best be seen in Figs. 2 and 3, it includes a plurality of transversely extending manifolds or headers 25 supported on and between the I-beams 24. Extending upwardly from and between the manifolds are a plurality of spaced longitudinally extending nozzles 26. Each of the nozzles comprises a bottom wall 27 (Fig. 4), side walls 28 having converging side portions 29, and end walls 30. The converging side portions 29 define a longitudinal slot or orifice 31 therebetween at the extreme ends of the nozzles through which the cooling medium may pass and be directed to the sheets passing thereby. Cooling medium may be supplied to the respective nozzles through slots 32 (Fig. 4) formed in the bottom wall 27 which mate with corresponding slots in the respective headers 25. This cooling medium may be supplied to the headers or manifolds by pipes or conduits 33 connected to a suitable source not shown.

Referring now to the upper blast-head 20, it is formed in a manner substantially similar to the lower blast-head 21 and includes transversely extending upper manifolds or headers 34 mounted on the frame cross beams 23. Nozzles 35, similar to nozzles 26, extend between the respective manifolds 34 in a direction substantially parallel to the direction of movement $x$ of the sheets S and are connected to the manifolds 34 through slots similar to the slots 32 described above in connection with the lower blast-head 21. The upper nozzles 35 may be staggered with relation to the lower nozzles 26 to give a more uniform quenching pattern as may be clearly seen in Fig. 2. Cooling medium as described hereinbefore may be supplied to each of the manifolds 34 by a suitable conduit or pipe 33 connected to a source not shown.

If the sheets to be tempered are curved such as illustrated in Fig. 2, the nozzles 26 and 35 may be displaced with respect to one another so that the ends thereof substantially correspond to the curvature of the sheets. For example, the nozzles 35 of the upper blast-head 20 may be convex downwardly while the nozzles 26 of the lower blast-head 21 may be concave downwardly. Thus, the molds may carry the bent glass sheet through the space between the nozzles 26 and 35, with the nozzles located equally close to all portions of the sheet to be cooled. Of course, it will be evident that the ends of the nozzles may be varied to conform to any desired glass curvature and that the nozzles may be used equally effectively with flat glass sheets. Also, it will be apparent that various types of cooling mediums or fluids may be used such as air, special gases, etc., to achieve the desired cooling effect.

In operation, before striking the sheets, the cooling medium first passes through the pipes or conduits 33 to the manifolds 25 and 34 and then to the nozzles 26 and 35. After entering the nozzles, because of the restricted openings afforded by the orifices 31, the cooling medium under pressure flows along the length of the nozzles and emerges from the orifices in layers or strips substantially parallel to the direction of movement x of the sheets S and the molds 10. Of course, after the cooling medium leaves the orifices 31, it diverges and spreads out to give the desired sweep or quenching effect over the passing sheets.

If desired, the direction of the cooling medium coming from the nozzles may be controlled by the use of directional fins or plates 36 (Fig. 5) which may be formed of bendable metal so that they may be changed to any angle depending on the flow pattern desired. In other words, as the cooling medium emerges from orifices 31, it strikes the directional fins 36 and is deflected to form angularly disposed streams of cooling medium which may diverge slightly to overlap one another longitudinally of the path of the sheet and also to overlap the cooling medium stream from adjacent nozzles so as to sweep the sheets in a definite pattern. However, while the fins 36 have been shown to be alternately placed on one side and then the other of the nozzle orifices 31, it will be evident that they may be placed only on one side of an orifice or in different alternate arrangements and may be at different angles with respect to one another so as to deflect the cooling medium progressively as it emerges from the orifice slot 32. Also, in some cases different sized orifices or slots may be used where the distance to glass surface from the nozzles varies due to the cooling medium deflection pattern and/or the curvature of the sheets.

After the cooling medium strikes a passing sheet S, it may be exhausted through openings or spaces 37 provided between the respective nozzles and the respective manifolds. By providing a means of quickly removing the hot expanded cooling medium after it has been deflected from the hot sheets, a better tempering or quenching effect is obtained over the sheets and less force is required to be supplied to the cooling medium in the form of pressure to penetrate the hot film layer next to the surface since back pressures which tend to build up along the path of the sheets are reduced.

In moving through the quenching station 15, the molds and the glass sheets S are carried by the conveyors 13 and 14. Each of the conveyors 13 and 14 consists of a conveyor chain 38 (Figs. 2 and 3) which is driven by a sprocket not shown mounted on a short cross shaft 39 on upright supports 40. The shaft 39 at its outer end carries a sprocket 41 over which is trained a drive chain 42 connected to a suitable power source not shown. The conveyor chains 38 during travel are guided between channel irons 43 which together with the base plate 44 form a box-like frame for the chains. In this arrangement, the upper portions of channel irons 43 form a support for the upper flight of the conveyor chain and serve as side guards for preventing the molds 10 from departing from their path.

Reviewing now the entire process of the invention by which sheets of glass may be tempered, glass sheets S are placed on the molds 10 along the conveyor section 11 and pass through the heating furnace or chamber 12 after which they are transferred onto the conveyor sections 13 and 14 and moved through the quenching or tempering station 15. During passage through the tempering station 15, the sheets may be quenched or cooled uniformly across their entire width by means of the longitudinally extending strips or layers of cooling medium flowing through the orifices 31 of the staggered upper and lower nozzles 26 and 35 respectively. The layers or strips of cooling medium coming from the nozzles are substantially parallel to the direction of travel of the sheets and, if desired, directional fins or reflector plates 36 may be used to deflect the cooling medium in a predetermined sweeping pattern, although in some cases they are not necessary. After passing through the quenching or tempering station 15, the sheets are transferred to the conveyor section 16 and moved to the unloading conveyor 18.

While one method of tempering or quenching sheet material has been shown and described, it will also be evident that the cooling medium may be regulated by controlling the size of the orifices 31 which may be done by any suitable means not shown. Also, in the event turbulence is discovered, the directional fins or plates 36 may be adjusted to control the pattern of the flow of the cooling medium. Moreover, the respective nozzles may be blocked off in portions or made of different sizes to control the flow pattern, or the nozzles may extend only between two of the manifolds, or in some cases, they may be connected to only one of the manifolds depending on the quenching pattern desired. It will also be evident that the sheets may be tempered while in a substantially stationary position and the nozzles may be moved relative to the sheets to effect the desired quenching, or both the sheets and the nozzles may be moved relative to one another.

In this connection, it will of course be understood that the form of the invention disclosed herein is to be taken as the preferred embodiment thereof and that various changes in the shape, size and arrangement of parts may be resorted to without departing from the spirit of the invention or the scope of the following claims.

I claim:

1. Apparatus for treating sheets or plates, comprising a support for holding a sheet to be treated, means for directing a fluid medium onto a surface of said sheet, said last named means including a relatively long slot through which the fluid medium may pass, deflecting fins rigidly mounted adjacent said slot for deflecting the fluid medium away from its normal path toward said sheet after it passes through said slot, and means for creating relative movement between said sheet support and said slot in a direction substantially parallel to said slot to cause a fluid medium passing through said slot to contact the surface of said sheet.

2. Apparatus for tempering sheets or plates, comprising a support for holding a sheet to be tempered, means for directing a fluid cooling medium onto a surface of said sheet including a slot through which cooling medium may pass, means for bringing cooling medium to said slot, means for creating relative movement between said sheet and said slot, said slot being disposed substantially parallel to the direction of movement between the slot and sheet, and a plurality of stationary deflection fins mounted adjacent said slot for deflecting the cooling medium after it passes through said slot from its normal path toward said sheet.

3. Apparatus for tempering sheets or plates as claimed in claim 2, in which said deflection fins are alternately positioned on one side and then the other of said slot to alternately deflect the cooling medium to one side and then the other of said slot.

4. In apparatus for tempering bent glass sheets while being moved along a predetermined path, plenum chambers above and below said path, means for bringing cooling medium to said plenum chambers, conveyors extending at right angles to said plenum chambers and parallel to one another, a plurality of elongated spaced nozzles fixedly mounted on said plenum chambers and extending parallel to said conveyors in close proximity to the glass sheets, the nozzles attached to the plenum chamber above said path being substantially staggered with respect to the nozzles attached to the plenum chamber below said path said nozzles being substantially straight and having relatively long narrow slots therein substantially parallel to said conveyors, a plurality of stationary deflection fins mounted adjacent said slots for deflecting the cooling medium after it passes through said plenum chambers and said nozzles from its normal path toward said sheets whereby said cooling medium is exhausted between said spaced nozzles after striking said sheets and a mold adapted to carry said bent glass sheets along said conveyors between said plenum chambers.

References Cited in the file of this patent

UNITED STATES PATENTS

| | | |
|---|---|---|
| 2,170,749 | Forbes | Aug. 22, 1939 |
| 2,188,401 | Crowley | Jan. 30, 1940 |
| 2,213,405 | Paddock | Sept. 3, 1940 |
| 2,646,647 | Bamford et al. | July 28, 1953 |

FOREIGN PATENTS

| | | |
|---|---|---|
| 707,949 | Germany | July 8, 1941 |